(12) United States Patent
Uehara

(10) Patent No.: US 9,519,326 B2
(45) Date of Patent: Dec. 13, 2016

(54) POWER MANAGEMENT CONTROLLER, POWER MANAGEMENT CIRCUIT USING THE SAME, AND ELECTRONIC DEVICE

(71) Applicant: ROHM CO., LTD., Ukyo-ku, Kyoto (JP)

(72) Inventor: Teruaki Uehara, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 74 days.

(21) Appl. No.: 14/669,509

(22) Filed: Mar. 26, 2015

(65) Prior Publication Data

US 2015/0277526 A1    Oct. 1, 2015

(30) Foreign Application Priority Data

Mar. 31, 2014 (JP) ................. 2014-073107

(51) Int. Cl.
*G06F 1/32*  (2006.01)
(52) U.S. Cl.
CPC ............ *G06F 1/3206* (2013.01); *G06F 1/329* (2013.01); *G06F 1/3228* (2013.01); *Y02B 60/144* (2013.01)

(58) Field of Classification Search
CPC ....... G06F 1/3206; G06F 1/329; G06F 1/3228
See application file for complete search history.

(56) References Cited

U.S. PATENT DOCUMENTS

| 7,630,841 | B2* | 12/2009 | Comisky | ............... G01R 31/40 702/60 |
| 7,786,793 | B2* | 8/2010 | Ogata | ..................... G06F 1/32 327/530 |
| 2002/0112193 | A1* | 8/2002 | Altman | ................ G06F 1/3203 713/323 |
| 2014/0223153 | A1* | 8/2014 | Hsieh | ..................... G05F 1/625 713/1 |

FOREIGN PATENT DOCUMENTS

JP     2013089060 A    5/2013

* cited by examiner

*Primary Examiner* — Stefan Stoynov
(74) *Attorney, Agent, or Firm* — Cantor Colburn LLP

(57) ABSTRACT

A power management controller for controlling start and stop of a plurality of power supplies is disclosed. Each of the power supplies belongs to one of N rails, in which (N+1) states including a first state where all of the rails are turned off and a $(k+1)^{th}$ state ($k=1, 2, \ldots N$) where a first rail to a $k^{th}$ rail are turned on are specified. The power management controller includes a task list memory, a head address register file, a state indicator, and an event management unit.

9 Claims, 10 Drawing Sheets

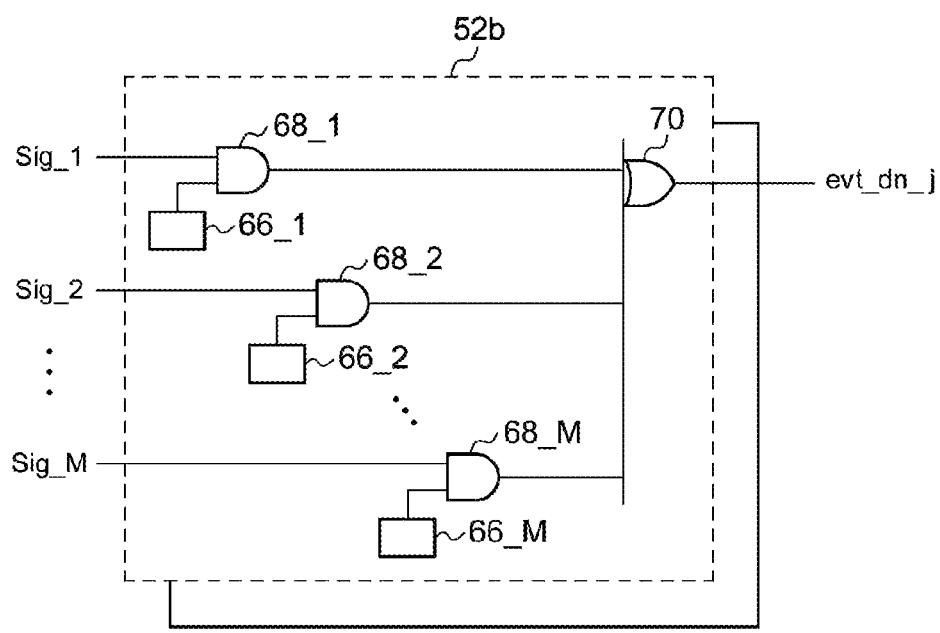

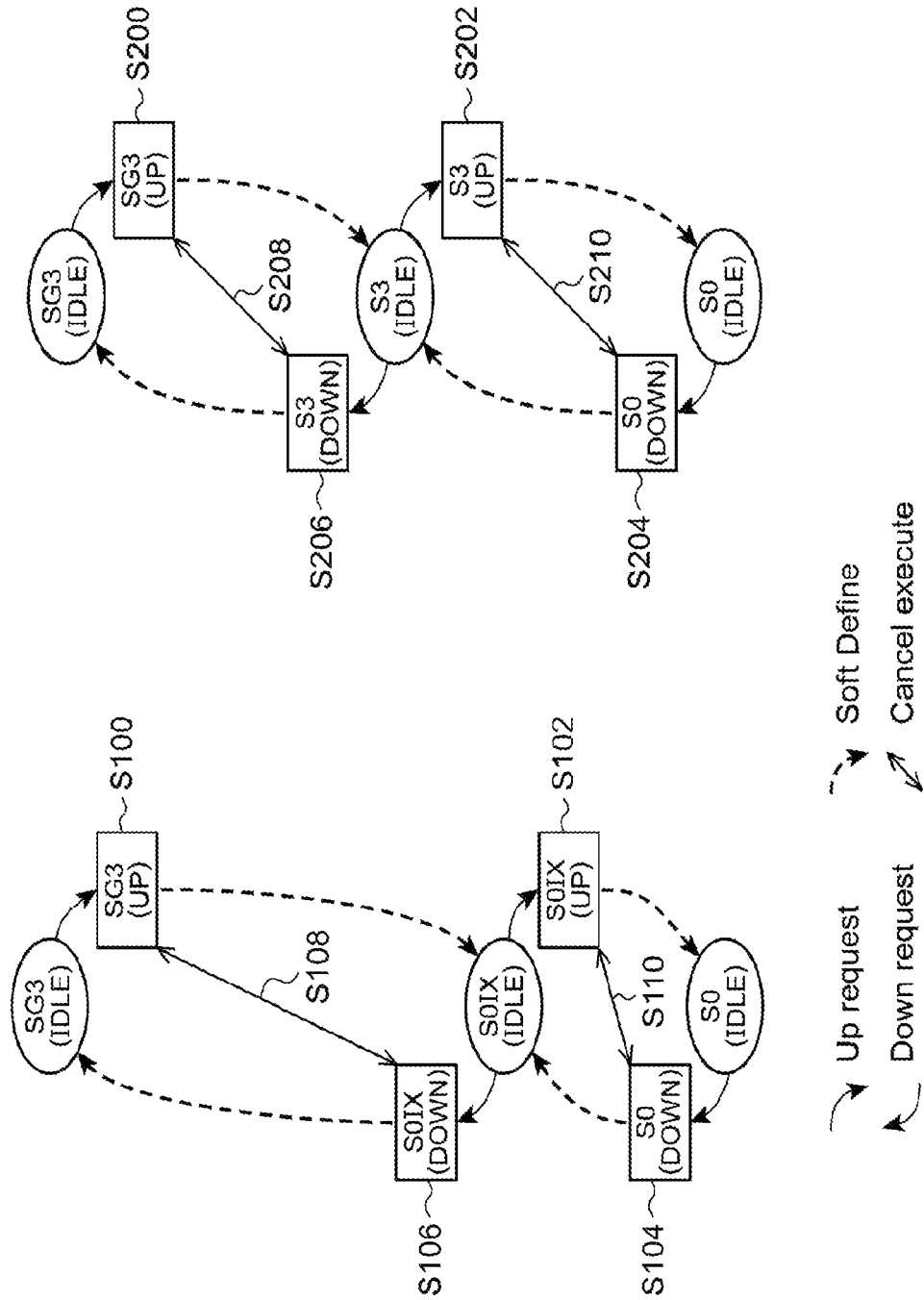

POWER MANAGEMENT CONTROLLER, POWER MANAGEMENT CIRCUIT USING THE SAME, AND ELECTRONIC DEVICE

CROSS-REFERENCE TO RELATED APPLICATION

This application is based upon and claims the benefit of priority from Japanese Patent Application No. 2014-073107, filed on Mar. 31, 2014, the entire contents of which are incorporated herein by reference.

TECHNICAL FIELD

The present disclosure relates to a power management technique for managing and controlling a plurality of power supplies.

BACKGROUND

Conventional electronic devices such as a mobile phone, a tablet terminal, a notebook personal computer (PC), a desktop computer, a game machine, and so on include a microprocessor such as a CPU (Central Processing Unit), GPU (Graphics Processing Unit), or the like for processing operations.

According to miniaturization of semiconductor manufacturing processes, an increase of mounted peripheral circuits, and demand for low power consumption, such an electronic device equipped with a microprocessor is segmented into dozens of circuit blocks such that a power supply voltage for each circuit block can be independently controlled.

Conventional electronic devices use a power management IC (PMIC) to control dozens of power supply systems corresponding to the dozens of circuit blocks. The PMIC is required to reliably control turning-on/off of dozens of power supplies in accordance with a predetermined sequence.

The following properties are required for PMIC.

(1) Robustness and Stability

The PMIC requires a mechanism which is capable of preventing an external noise or the like from being overshot.

(2) Safety

The PMIC requires an ability to shut down power supply systems autonomously without relying on other devices when it is in an abnormal state.

(3) Power Saving

The PMIC requires the minimum power consumption since it is necessary for the PMIC to operate even when the system shuts down.

However, it was difficult to use a general purpose microcomputer to construct the PMIC meeting these requirements. Therefore, in the related art, in order to meet the requirements for each electronic device, it was necessary to design a dedicated sequencer in a hardware manner each time.

The plurality of power supplies is classified into several rails. Then, the PMIC can turn on/off the rails independently and a state is specified depending on combination of rails which are in the turned-on state. Specifically, in addition to a state where all power supply rails are turned off and a state where all power supply rails are turned on, there exists some intermediate turned-on stages of the plurality of power supply rails.

In some cases, different platforms on which the PMIC is used may provide different states to be used. For example, since the PMIC may take five states, i.e., first to fifth states if there are four power supply rails, only the first state, the third state, and the fifth state may be used on one platform while only the first state, the fourth state and the fifth state may be used on another platform. In this case, in the conventional art, a PMIC corresponding to the one platform was constructed in a hardware manner to support the first, third and fifth states while a PMIC corresponding to another platform was constructed in a hardware manner to support the first, fourth and fifth states. That is, it was necessary to construct different new hardware of the PMIC for different platforms, which might result in very high design costs.

In the conventional art, even on the same platform, if a starting sequence of some power supplies in the same rail was to be changed, significant design change of hardware was unavoidable. Thus, even a slight change required mask modification, which resulted in extended design time.

SUMMARY

The present disclosure provides some embodiments of a PMIC which is capable of flexibly dealing with a variety of desired requirements.

According to one embodiment of the present disclosure, there is provided a power management controller for controlling start and stop of a plurality of power supplies, each of which belongs to one of N rails, in which (N+1) states including a first state where all of the rails are turned off and a $(k+1)^{th}$ state ($k=1, 2, \ldots N$) where a first rail to a $k^{th}$ rail are turned on are specified. The power management controller includes: a task list memory configured to (i) store a first start instruction group to start up a power supply group included in the first rail in order, a second start instruction group to start up a power supply group included in the second rail in order, ..., and an $N^{th}$ start instruction group to start up a power supply group included in the $N^{th}$ rail in order, and (ii) store an $N^{th}$ stop instruction group to stop a power supply group included in the $N^{th}$ rail in order, an $(N-1)^{th}$ stop instruction group to stop a power supply group included in the $(N-1)^{th}$ rail in order, ..., a second stop instruction group to stop a power supply group included in the second rail in order, and a first stop instruction group to stop a power supply group included in the first rail in order, wherein, (iii) when the power management controller supports up-transition from an $i^{th}$ state to a $j^{th}$ state ($j>i$), for all supported j, an end instruction is inserted in an end of a $(j-1)^{th}$ start instruction group, (iv) when the power management controller supports down-transition from the $j^{th}$ state to the $i^{th}$ state ($j>i$), for all supported i, an end instruction is inserted in an end of an $i^{th}$ stop instruction group, (v) the end instruction included in the end of the $((j-1)^{th}$ start instruction group is associated with a transition destination code indicating that a transition destination is the $j^{th}$ state, and (vi) the end instruction included in the end of the $i^{th}$ stop instruction group is associated with a transition destination code indicating that the transition destination is the $i^{th}$ state; a head address register file configured to (i) store a head address of the $i^{th}$ start instruction group for all supported i when the power management controller supports up-transition with the $i^{th}$ state as a starting point, and (ii) store a head address of the $j^{th}$ stop instruction group for all supported j when the power management controller supports down-transition with the $j^{th}$ state as a starting point; a state indicator indicative of a current state; an instruction execution unit configured to (i) read and execute, when a start address is designated, instruction groups stored in the task list memory in order with the designated start address as a starting point, (ii) stop the execution of the instruction groups upon reading an end instruction, and (iii) update data of the state indicator to a state indicated by a transition destination code associated with the end instruction upon reading the end instruction; and an event management unit configured to, (i) when the state indicator indicates the $i^{th}$ state, if a control signal satisfies an up-transition condition determined for the $i^{th}$ state, provide the head address of the $i^{th}$ start instruction group as a start address from the head address register file to the instruction execution unit, and (ii) when the state indicator indicates the $j^{th}$ state, if the control signal satisfies a down-transition condition determined for the $j^{th}$ state, provide the head address of the $j^{th}$ stop instruction group as a start address from the head address register file to the instruction execution unit.

With this configuration, it is possible to flexibly deal with a variety of desired design requirements without changing most of the hardware portions.

The head address register file may store a head address of each of the first to $N^{th}$ start instruction groups and store a head address of each of the first to $N^{th}$ stop instruction groups. Combinations of all of the states can be supported by storing head addresses of all of the start instruction groups and stop instruction groups.

The transition destination code may be accompanied by the associated end instruction and stored in the task list memory. Thus, when decoding the end instruction, it is possible to immediately know a next state without reference to other memories or registers.

The power management controller may further include a cancel register file configured to (i) store a table that associates each up-transition with the $j^{th}$ state of a transition destination when up-transition from the $i^{th}$ state to the $j^{th}$ state is supported and (ii) stores a table that associates each down-transition with the $i^{th}$ state of the transition destination when down-transition from the $j^{th}$ state to the $i^{th}$ state is supported. The event management unit (i) may acquire that a transition destination of up-transition is the $j^{th}$ state by referring to the cancel register file when the up-transition is cancelled during execution of a start instruction group with the $i^{th}$ state as a starting point, and then provide the instruction execution unit with a head address of a $(j-1)^{th}$ stop instruction group, as a start address, and (ii) may acquire that a transition destination of down-transition is the $i^{th}$ state by referring to the cancel register file when the down-transition is cancelled during execution of a stop instruction group with the $j^{th}$ state as a starting point, and then provide the instruction execution unit with a head address of the $i^{th}$ start instruction group as a start address. With this configuration, a correct return to the original state is possible when any transition is cancelled.

The instruction execution unit may include: a task list processor configured to include a program counter, set a given start address in the program counter, and increment a value of the program counter by one; and an instruction decoder configured to decode an instruction with an address corresponding to the program counter value, the instruction being loaded from the task list memory into the instruction decoder.

The event management unit may include: an event generator configured to receive the control signal, and assert an up-transition event signal if the control signal satisfies the up-transition condition determined for the $i^{th}$ state and asserts a down-transition event signal if the control signal satisfies the down-transition condition determined for the $j^{th}$ state; and a start address selector configured to load the head address of the $i^{th}$ start instruction group from the head address register into the instruction execution unit when the up-transition event signal for the up-transition with the $i^{th}$ state as a starting point is asserted, and load the head address of the $j^{th}$ stop instruction group from the head address register into the instruction execution unit when the down-transition event signal for the down-transition with the $j^{th}$ state as a starting point is asserted.

The event management unit may include: a plurality of logic gates to which the control signal is input; and a register configured to be set from the outside. The up-transition conditions determined for the $i^{th}$ state and the down-transition conditions determined for the $j^{th}$ state may be changed based on a value of the register.

According to another embodiment of the present disclosure, there is provided a power management circuit including: the above-described power management controller; and a plurality of power supplies configured to be controlled by the power management controller, wherein the power management controller and the plurality of power supplies are integrated on a single semiconductor substrate.

As used herein, the term "integrated" may include a case where all elements of a circuit are formed on a semiconductor substrate or a case where main elements of the circuit are integrated on a semiconductor substrate. In addition, some resistors, capacitors, or the like for adjustment of a circuit constant may be provided outside the semiconductor substrate.

By integrating the circuits as a single IC, it is possible to reduce a circuit area while maintaining characteristics of circuit elements uniformly.

According to another embodiment of the present disclosure, there is provided an electronic device including: a processor having a plurality of power supply terminals; and the above-described power management circuit configured to supply a power supply voltage to the plurality of power supply terminals of the processor.

Any combinations of the above-described elements or changes of the representations of the present disclosure between methods, apparatus, and systems are also effective as embodiments of the present disclosure.

BRIEF DESCRIPTION OF THE DRAWINGS

FIGS. 4A and 4B are circuit diagrams showing exemplary configurations of an event generator.

FIGS. 5A and 5B are state transition diagrams of the PMIC.

DETAILED DESCRIPTION

Figure 1:
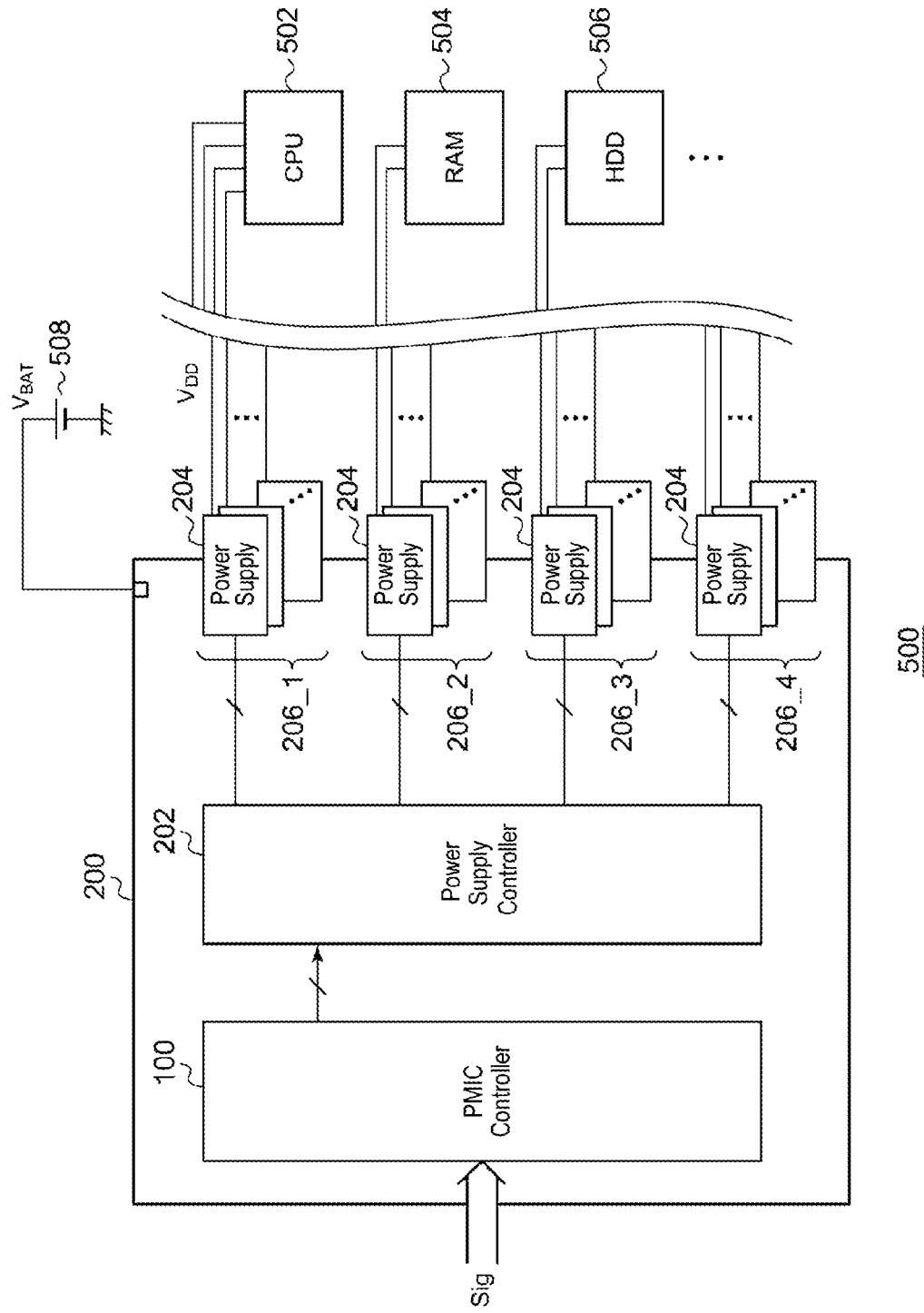
FIG. 1 is a block diagram of an electronic device that includes a power management IC according to one embodiment of the present disclosure.

Embodiments of the present invention will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include a direct physical connection between the member A and the member B as well as an indirect connection thereof via other member as long as the other member has no substantial effect on the electrical connection between the member A and the member B. Likewise, the phrase "interposition of a member C between a member A and a member B" is intended to include a direct connection between the member A and the member C or a direct connection between the member B and the member C as well as an indirect connection thereof via another member as long as the other member has no substantial effect on the electrical connections.

(Peripheral Circuit)

FIG. 1 illustrates a block diagram of an electronic device 500 that includes a power management IC (PMIC) 200 according to one embodiment of the present disclosure.

The electronic device 500 is configured to include a plurality of components such as a CPU 502, a random access memory (RAM) 504, a hard disk drive (HDD) 506, etc., a battery 508 such as a lithium ion battery, a nickel hydrogen battery, or the like, and a PMIC 200. The PMIC 200 receives a battery voltage $V_{BAT}$ from the battery 508 or a voltage from an AC adapter (not shown), and supplies appropriate power supply voltages to the plurality of components.

In order to normally operate these components such as the CPU 502, the RAM 504, the HDD 506, etc., it may be necessary to start the components in a predetermined sequence. Accordingly, it may be necessary for ON/OFF sequences of power supply voltages for the components to be correctly controlled in an order of few microseconds (μs). For example, supply of power to the RAM 504 has to be completed before the CPU 502 accesses the RAM 504.

Recently, the CPU 502 has been segmented into dozens of circuit blocks, each of which is equipped with a power supply terminal and able to be supplied with a separate power supply voltage. In this configuration, reduction of power consumption has been achieved by switching on/off a power supply voltage for each of the power supply terminals according to operation conditions of the CPU 502.

The PMIC 200 supplies a plurality of power supply voltages $V_{DD}$ to the components such as the CPU 502, the RAM 504, the HDD 506, etc. The PMIC 200 is a functional IC including a power management (PM) controller 100, a power supply controller 202 and a plurality of power supplies 204, all of which are integrated on a single semiconductor substrate.

The plurality of power supplies 204 is configured to be individually switched on/off. The power supplies 204 may be DC/DC converters of a step-up type, a step-down type or a step-up/step-down type, an LDO (Low Drop Output) or a charge pump circuit. It is appreciated by those skilled in the art that some of the components (for example, an inductor, a transformer, a smoothing capacitor, a feedback resistor, a switching element, etc.) constituting the power supplies 204 may be constituted as chip components or discrete components and be disposed outside of the PMIC 200.

The PM controller 100 may be a sequencer configured to receive a plurality of control signals Sig from the CPU 502 or a main power button of the electronic device and control start and stop of the plurality of power supplies 204 in a sequence that meets desired specifications based on the control signals Sig. The power supply controller 202 is an interface between the PM controller 100 and the plurality of power supplies 204 and controls turning-on/off of the plurality of power supplies 204 based on an output from the PM controller 100.

(Power Rail)

Each of the plurality of power supplies 204 belongs to one of N rails 206_1 to 206_N (N≥2). In this embodiment, for the purpose of easy understanding, a case of N=4 will be described. First to fourth rails will be explained with the following aliases.

First rail=Rail A
Second rail=Rail U
Third rail=Rail S
Fourth rail=Rail SX (Power State)

The following (N+1) states are specified for this power system.

First state=All rails off
Second state=First rail on, the rest off
Third state=First and second rail on, the rest off
. . .
$N^{th}$ state=First to $(N-1)^{th}$ rails on, the rest off
$(N+1)^{th}$ state=All first to $N^{th}$ rails on If these are generalized, a state where the first to $k^{th}$ states are turned on may be referred to as a $(k+1)^{th}$ state.

In this embodiment, N=4 and the following first to fifth states may be assumed.

First state SG3=All rails off
Second state S4=First (A) rail off
Third state S3=First and second (A+U) rails on
Fourth state S0ix=First to third (A+U+S) rails on
Fifth state S0=First to fourth (A+U+S+SX) rails on The PMIC 200 can support any one, which is desired by the designer of the electronic device 500, among the first to fifth states, based on a type of electronic device mounted with the PMIC 200, a type of CPU used herein, a type of OS (Operating System) used therein, etc.

As one example, in combination with a certain CPU, when placed under control of a first OS (for example, Windows 8® owned by Microsoft), three states including the first state SG3, the fourth state S0ix, and the fifth state S0 may be used. In this case, in addition to the first state SG3, the fourth state S0ix, and the fifth state S0, the PMIC 200 supports up-transition from the first state SG3 to the fourth state S0ix, up-transition from the fourth state S0ix to the fifth state S0, down-transition from the fifth state S0 to the fourth state S0ix, and down-transition from the fourth state S0ix to the first state SG3.

As another example, in combination with the same CPU, when placed under control of a second OS (for example, Android® owned by Google), three states including the first state SG3, the third state S3 and the fifth state S0 may be used. In this case, in addition to the first state SG3, the third state S3 and the fifth state S0, the PMIC 200 supports up-transition from the first state SG3 to the third state S3, up-transition from the third state S3 to the fifth state S0, down-transition from the fifth state S0 to the third state S3, and down-transition from the third state S3 to the first state SG3.

The PMIC 200 is capable of supporting any such states and transitions between the states is provided in this embodiment.

(Power Management Controller)

Figure 2:
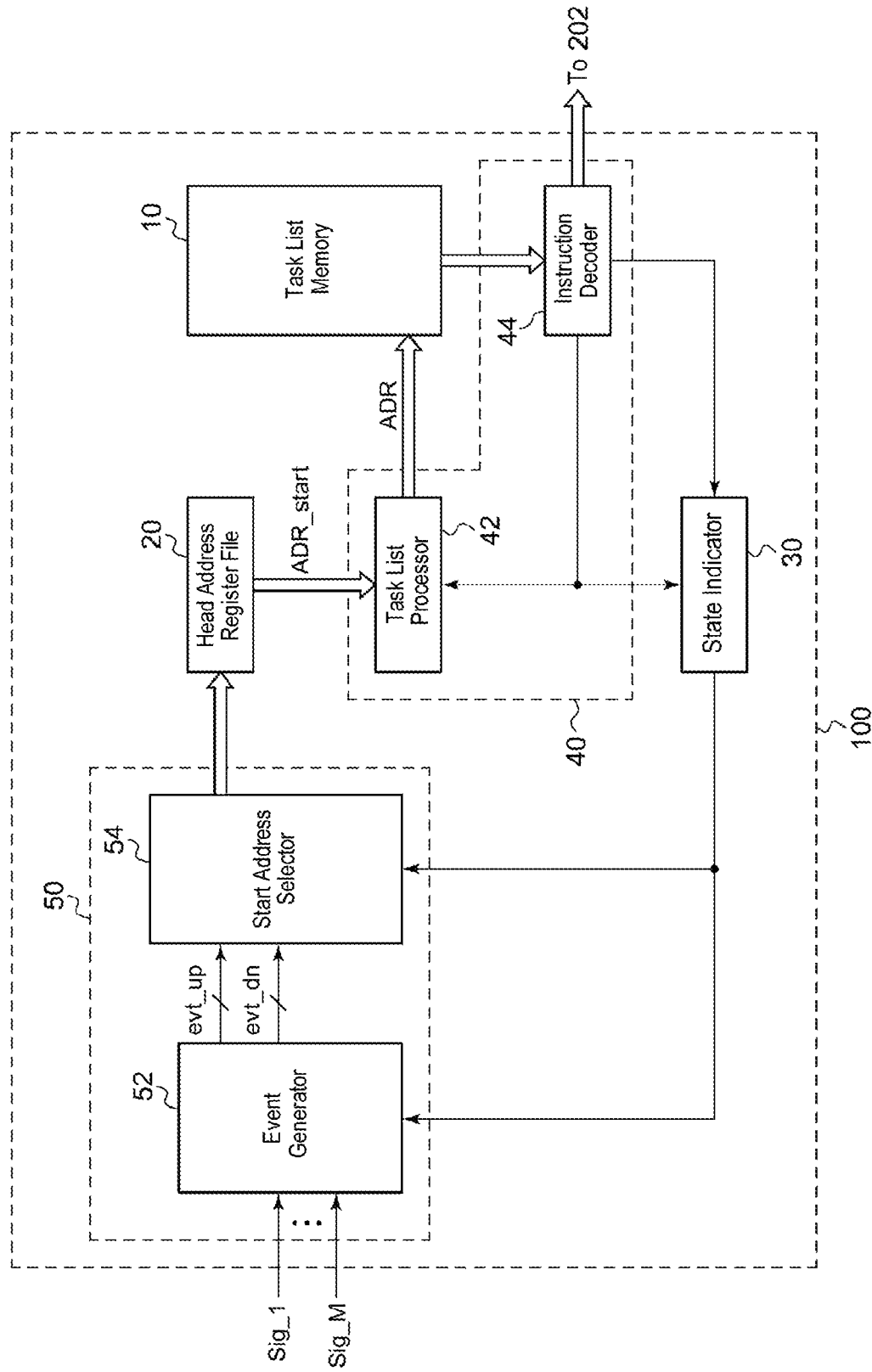
FIG. 2 is a block diagram showing a configuration of a PM controller.

FIG. 2 is a block diagram showing a configuration of the PM controller 100. The PM controller 100 is configured to include a task list memory 10, a head address register file 20, a state indicator 30, an instruction execution unit 40, and an event management unit 50, as will be described below.

(Task List Memory)

Instructions describing a sequence of the PM controller 100 are stored in the task list memory 10. The instructions and data stored in the task list memory 10 are loaded from a nonvolatile memory (i.e., a ROM such as a mask ROM or EEPROM).

Figure 3A:
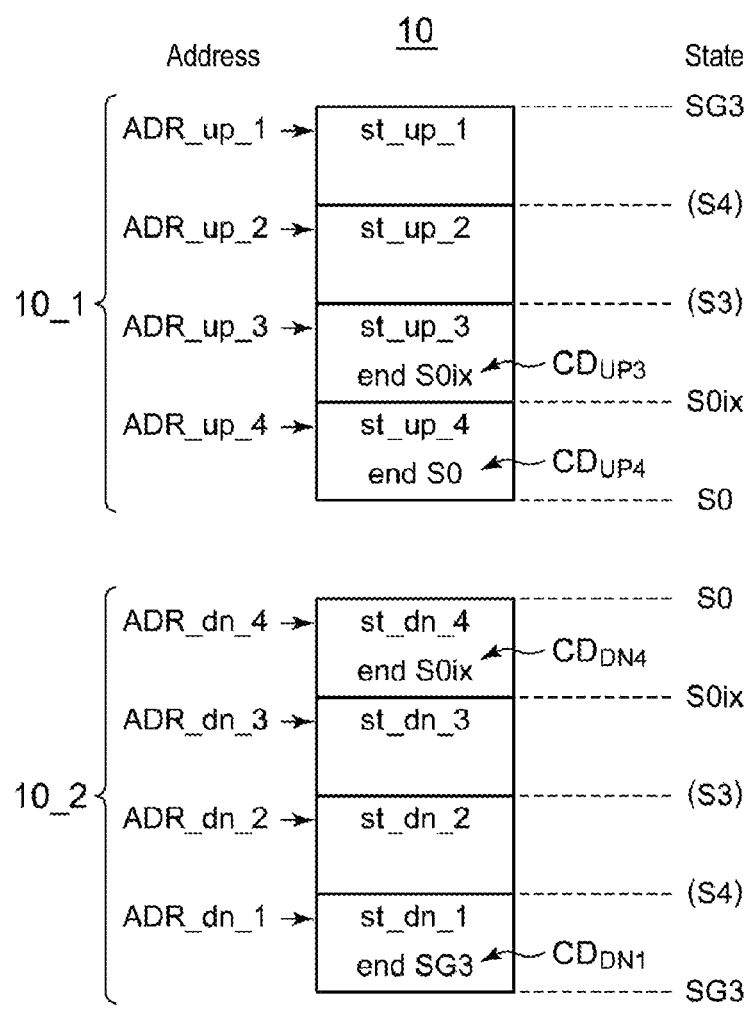
FIGS. 3A and 3B are diagrams showing instructions stored in a task list memory.
Figure 3B:
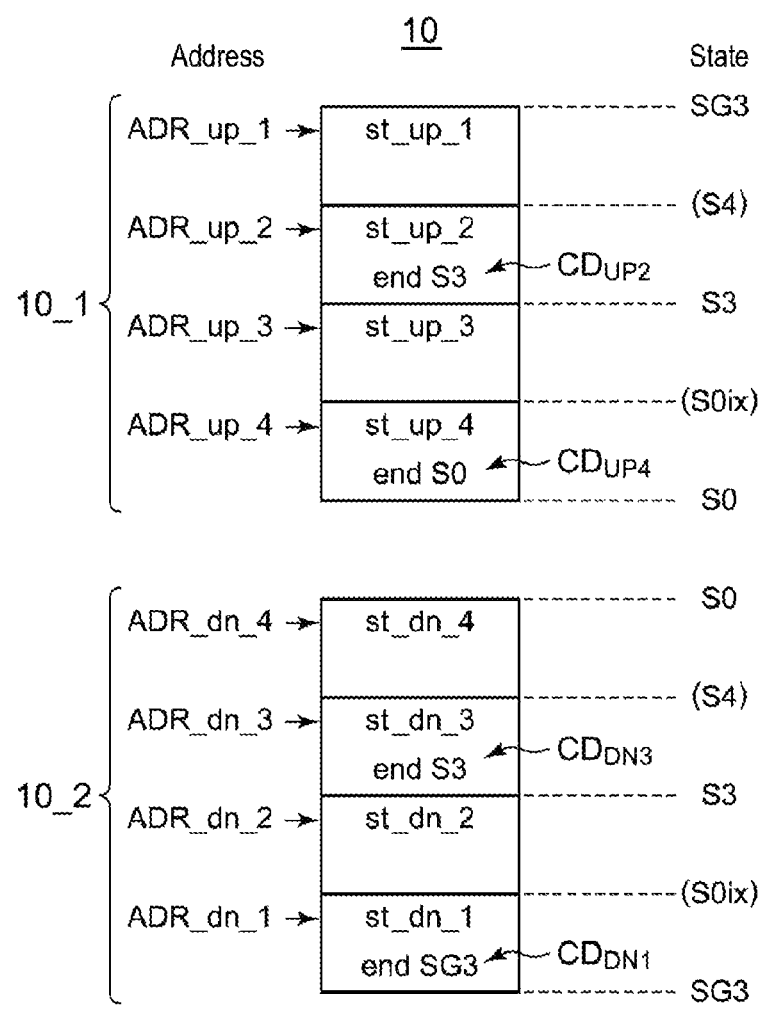

FIGS. 3A and 3B are diagrams showing instructions stored in the task list memory 10. Instructions for support of Windows 8 are shown in FIG. 3A and instructions for support of Android are shown in FIG. 3B. The task list memory 10 holds instructions to be executed by the PM controller 100, i.e., tasks, in a list form and stores several start instruction groups st_up and several stop instruction groups st_dn.

(i) In a first address area 10_1 of the task list memory 10, the following instructions are stored in order.

A first start instruction group st_up_1 to start up a power supply group included in the first rail A in order A second start instruction group st_up_2 to start up a power supply group included in the second rail U in order A third start instruction group st_up_3 to start up a power supply group included in the third rail S in order A fourth start instruction group st_up_4 to start up a power supply group included in the fourth rail SX in order (ii) Additionally, in a second address area 10_2 of the task list memory 10, the following instructions are stored in order.

A fourth stop instruction group st_dn_4 to stop the power supply group included in the fourth rail SX in order A third stop instruction group st_dn_3 to stop the power supply group included in the third rail S in order A second stop instruction group st_dn_2 to stop the power supply group included in the second rail U in order A first stop instruction group st_dn_1 to stop the power supply group included in the first rail A in order When the PM controller 100 supports up-transition from an $i^{th}$ state to a $j^{th}$ state (j>i), for all supported j, an end instruction is inserted in the end of a $(j-1)^{th}$ start instruction group. The instruction "end," which is a mnemonic (instruction syntax), is merely illustrative.

For example, the following up-transitions are supported for Windows 8.

Up-transition from the first state SG3 to the fourth state S0ix

Up-transition from the fourth state S0ix to the fifth state S0

Accordingly, as shown in FIG. 3A, an end instruction "end" is inserted in the end of the third start instruction group st_up_3 and the end of the fourth start instruction group st_up_4.

As another example, the following up-transitions are supported for Android.

Up-transition from the first state SG3 to the third state S3

Up-transition from the third state S3 to the fifth state S0

Accordingly, as shown in FIG. 3B, an end instruction "end" is inserted in the end of the second start instruction group st_up_2 and the end of the fourth start instruction group st_up_4.

The end instruction "end" included in the end of the $(j-1)^{th}$ start instruction group is linked with a transition destination code $CD_{UPj-1}$, indicating that a transition destination is the $j^{th}$ state.

For example, for Windows 8, the end instruction in the end of the third start instruction group st_up_3 is associated with a transition destination code $CD_{UP3}$ (=S0ix) while the end instruction in the end of the fourth start instruction group st_up_4 is associated with a transition destination code $CD_{UP4}$ (=S0), as shown in FIG. 3A.

For Android, the end instruction in the end of the second start instruction group st_up_2 is associated with a transition destination code $CD_{UP2}$ while the end instruction "end" in the end of the fourth start instruction group st_up_4 is linked with a transition destination code $CD_{UP4}$, as shown in FIG. 3B.

When the PM controller 100 supports down-transition from a $j^{th}$ state to an $i^{th}$ state (j>i), for all supported i, an end instruction is inserted in the end of an $i^{th}$ stop instruction group.

For example, the following down-transitions are supported for Windows 8.

Down-transition from the fifth state S0 to the fourth state S0ix

Down-transition from the fourth state S0ix to the first state SG3

Thus, as shown in FIG. 3A, an end instruction "end" is inserted in the end of the fourth stop instruction group st_dn_4 and the end of the first stop instruction group st_dn_1.

As another example, the following down-transitions are supported for Android.

Down-transition from the fifth state S0 to the third state S3

Down-transition from the third state S3 to the first state SG3

Accordingly, as shown in FIG. 3B, an end instruction "end" is inserted in the end of the third stop instruction group st_dn_3 and the end of the first stop instruction group st_dn_1.

The end instruction included in the end of the $i^{th}$ stop instruction group is associated with a transition destination code $CD_{DNi}$ indicating that a transition destination is the $i^{th}$ state.

For example, for Windows 8, the end instruction in the end of the fourth stop instruction group st_dn_4 is associated with a transition destination code $CD_{DN4}$ (=S0ix) while the end instruction in the end of the first start instruction group st_dn_1 is associated with a transition destination code $CD_{DN1}$ (SG3), as shown in FIG. 3A.

For Android, the end instruction in the end of the third stop instruction group st_dn_3 is associated with a transition destination code $CD_{DN3}$ (S3) while the end instruction in the end of the first stop instruction group st_dn_1 is associated with a transition destination code $CD_{DN1}$ (SG3), as shown in FIG. 3B.

For example, the transition destination codes $CD_{DN}$ and $CD_{UP}$ are accompanied by the linked end instructions and, more specifically, may be stored in the task list memory 10 in a format included in the same instructions. The description will be returned to FIG. 2.

(Head Address Register)

When the PM controller 100 supports up-transition from the $i^{th}$ state to the $j^{th}$ state (j>i), at least for all supported i, the head address register file 20 stores a head address ADR_up_i of an $i^{th}$ start instruction group st_up_i. When the PM controller 100 supports down-transition from the $j^{th}$ state to the $i^{th}$ state (j>i), at least for all supported j, the head address register file 20 stores a head address ADR_dn_j of a $j^{th}$ stop instruction group st_dn_j.

In this embodiment, regardless of whether or not support by the PM controller 100 is present, the head address register file 20 stores head addresses ADR_up_1 to N of all start instruction groups st_up_1 to N and stores head addresses ADR_dn_1 to N of all stop instruction groups st_dn_1 to N.
(State Indicator)

The state indicator 30 indicates a current state. Accordingly, the event management unit 50 can know a current state of the PM controller 100 by referring to the state indicator 30. Specifically, the state indicator 30 indicates any one of the first state SG3, the second state S4, the third state S3, the fourth state S0ix, and the fifth state S0 or indicates a transition from one state to another state.
(Instruction Execution Unit)

The instruction execution unit 40 (i) reads and executes, when a start address ADR_start is designated, an instruction group stored in the task list memory 10 in order with the designated start address ADR_start as a starting point. Next, the instruction execution unit 40 (ii) stops the execution of the instruction group upon reading an end instruction "end," and (iii) updates the state indicator 30 to be a state indicated by a transition destination code associated with the read end instruction "end" upon reading the end instruction "end."

For example, the instruction execution unit 40 includes a task list processor 42 and an instruction decoder 44. The task list processor 42 includes a program counter, sets a given start address ADR_start in the program counter, and increments a value of the program counter by one each time it receives a notification of completion of instruction execution from the instruction decoder 44. An instruction with an address corresponding to the program counter value is loaded into the instruction decoder 44. The instruction decoder 44 decodes the loaded instruction and controls the power supply controller 202.
(Event Management Unit)

The event management unit 50 is input with M number of control signals Sig_1 to Sig_M. The event management unit 50 is set with an up-transition condition and a down-transition condition determined for each state. When the state indicator 30 indicates the $i^{th}$ state, if the control signals Sig_1 to Sig_M satisfy the up-transition condition determined for the $i^{th}$ state, the event management unit 50 provides the head address ADR_up_i of the $i^{th}$ start instruction group as the start address ADR_start from the head address register file 20 to the instruction execution unit 40. Similarly, if the control signals Sig_1 to Sig_M satisfy the down-transition condition determined for the $j^{th}$ state, the event management unit 50 provides the head address ADR_dn_j of the $j^{th}$ stop instruction group st_dn_j as the start address ADR_start from the head address register file 20 to the instruction execution unit 40.

For example, the event management unit 50 includes an event generator 52 and a start address selector 54. The event generator 52 is input with the control signals Sig_1 to Sig_M and is set with event generation conditions. As used herein, an event refers to up-transition from the $i^{th}$ state to the $j^{th}$ state or down-transition from the $j^{th}$ state to the $i^{th}$ state.

The event generator 52 may include a logic gate with the control signals Sig_1 to Sig_M as an input. If the up-transition conditions with the $i^{th}$ state as a starting point are satisfied, the event generator 52 asserts an up-transition event signal evt_up_i (for example, a high level). In addition, if the down-transition conditions with the $j^{th}$ state as a starting point are satisfied, the event generator 52 asserts a down-transition event signal evt_dn_j.

When the up-transition event signal evt_up_i is asserted, the start address selector 54 provides the head address ADR_up_i of the $i^{th}$ start instruction group to the instruction execution unit 40. When the down-transition event signal evt_dn_j is asserted, the start address selector 54 provides the head address ADR_dn_j of the $j^{th}$ start instruction group to the instruction execution unit 40.

Figure 4A:
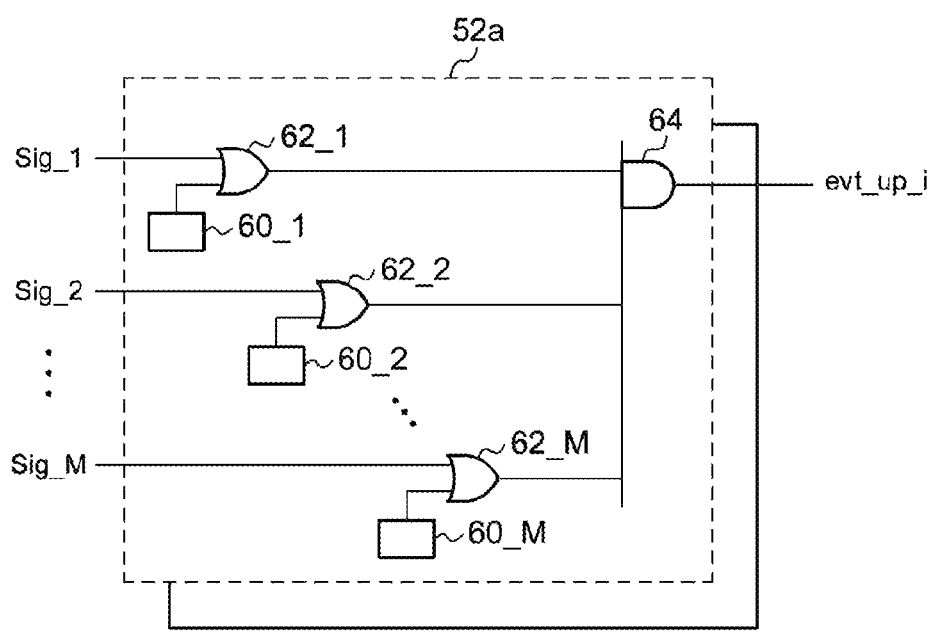

FIGS. 4A and 4B are circuit diagrams showing exemplary configurations of the event generator 52.

The event generator 52 is configured to be able to set transition conditions depending on a value stored in a register. FIG. 4A shows an event generator 52a for generating an up-transition event signal evt_up_i. The event generator 52a includes M number of registers 60_1 to 60_M, M number of OR gates 62_1 to 62_M, and an AND gate 64.

FIG. 4B shows an event generator 52b for generating the down-transition event signal evt_dn_j. The event generator 52b includes M number of registers 66_1 to 66_M, M number of AND gates 68_1 to 68_M, and an OR gate 70. Depending on whether each signal is low active or high active, a signal in a circuit may be appropriately inverted and the AND gates and/or the OR gates may be replaced with NAND gates or NOR gates, XOR gates, etc.

The event generator 52 is input with M number of control signals Sig_1 to Sig_M in case that M is six (6).
Sig_1=PWRBTN
Sig_2=SLP_S0IX_B
Sig_3=SLP_S3_B
Sig_4=SLP_S4_B
Sig_5=SUSPWDNACK
Sig_6=LOW_BAT_B
Where "_B" indicates an inverted logic.

In this case, the following up-transition event signals are defined.
(1) evt_up_1=SG3_up
SG3_up=PWRBTN
(2) evt_up_2=S4_up
S4_up=(SLP_S4_B|~S4u_S4)&
(~SUSPWDNACK|~S4u_SNK)&
(LOW_BAT_B|~S4u_BAT)
(3) evt_up_3=S3_up
S3_up=(SLP_S3_B|~S3u_S3)&(SLP_S4_B|~S3u_S4)&
(~SUSPWDNACK|~S3u_SNK)&
(LOW_BAT_B|~S3u_BAT)
(4) evt_up_4=S0ix_up
S0ix_up=(SLP_S0ix_B|~S0Xu_S0X)&
(SLP_S3_B|~S0Xu_S3)&(SLP_S4B|~S0Xu_S4)&
(~SUSPWDNACK|~S0Xu_SNK)

In this case, the following down-transition event signals are defined.
(5) evt_dn_5=S0_dn
S0_dn=(~SLP_S0IX_B & S0d_S0X)|
(~SLP_S3_B&S0d_S3)|(~SLP_S4_B&S0d_S4)|
(SUSPWDNACK&S0d_SNK)
(6) evt_dn_4=S0ix_dn
S0ix_dn=(~SLP_S3_B & S0Xd_S3)|
(~SLP_S4_B&S0Xd_S4)|
(~SUSPWDNACK&S0Xd_SNK)|
(~LOW_BAT_B&S0Xd_BAT)
(7) evt_dn_3=S3_dn
S3_dn=(~SLP_S4_B & S3d_S4)|
(SUSPWDNACK&S3d_SNK)|
(~LOW_BAT_B&S3d_BAT)
(8) evt_dn_2=S4_dn
S4_dn=(~SLP_S4_B & S4d_S4)|
(SUSPWDNACK&S4d_SNK)|
(~LOW_BAT_B&S4d_BAT)

Further, S4u_S4, S4u_SNK, S4u_BAT, S3u_S3, S3u_S4, S3u_SNK, S3u_BAT, S0Xu_S0X, S0Xu_S3, S0Xu_S4, S0Xu_SNK, S0d_S0X, S0d_S3, S0d_S4, S0d_SNK, S0Xd_S3, S0Xd_S4, S0Xd_SNK, S0Xd_BAT, S3d_S4, S3d_SNK, S3d_BAT, S4d_S4, S4d_SNK, and S4d_BAT are data items that are set in the register and the transition conditions may be freely set based on a value stored in each of the data items.

The configuration of the PMIC 200 has been described hitherto. Subsequently, operations of the PMIC 200 will be described. FIGS. 5A and 5B illustrate state transition diagrams of the PMIC 200.

(1) When the PMIC 200 is Operated on the Platform of Windows 8

The instructions shown in FIG. 3A are stored in the task list memory 10. In addition, register values are set in the event generator 52 such that the following event signals are generated.

SG3_up=PWRBTN
S0ix_up=~SLP_S0IX_B
S0_dn=SLP_S0IX_B
S0ix_dn=SUSPWDNACK

FIG. 5A is a state transition diagram at this time. The first state SG3 is an initial state. In the first state SG3, when a power button (PWR_BTN) is pressed, the event generator 52 asserts a SG3_up (evt_up_1) signal. When the SG3_up (evt_up_1) signal is asserted, the start address selector 54 loads the head address ADR_up_1 from the head address register file 20 into the task list processor 42. The task list processor 42 executes the instructions stored in the task list memory 10 in order from the loaded start address. Thus, the start instruction groups st_up_1, st_up_2 and st_up_3 are executed in order and the A rail, the U rail and the S rail are accordingly turned on in order (S100). As shown in FIG. 3A, the end instruction is inserted in the end of the start instruction group st_up_3 in which the instruction execution is stopped. The instruction decoder 44 sets the fourth state S0ix, which is indicated by the transition destination code $CD_{UP3}$ associated with the end instruction, in the state indicator 30.

In the fourth state S0ix, when the control signal SLP_S0IX_B is deasserted (negated), the S0ix_up (evt_up_4) signal is asserted. Then, the start instruction group st_up_4 is executed such that the SX rail is turned on (S102). Then, the PMIC 200 enters the fifth state S0 in accordance with the transition destination code $CD_{UP4}$.

In the fifth state S0, when the SLP_S0ix_B signal is asserted, the S0_dn (evt_dn_5) signal is asserted and the stop instruction group st_dn_4 is executed such that the SX rail is turned off (S104). The PMIC 200 then enters the fourth state S0ix in accordance with the transition destination code $CD_{UP4}$.

In the fourth state S0ix, when the SUSPWDNACK signal is asserted, the S0ix_dn (evt_dn_4) signal is asserted and the stop instruction groups st_dn_3, st_dn_2, and st_dn_1 are executed in order such that the S rail, the U rail and the A rail are turned off in order (S106). Then, the PMIC 200 enters the first state SG3 in accordance with the transition destination code $CD_{DN1}$.

(2) When the PMIC 200 is Operated on the Platform of Android

The instructions shown in FIG. 3B are stored in the task list memory 10. Register values are set in the event generator 52 such that the following event signals are generated.

SG3_up=PWRBTN
S3_up=~SLP_S3_B
S0_dn=SLP_S3_B
S3_dn=SUSPWDNACK

FIG. 5B is a state transition diagram at this time. The first state SG3 is an initial state. In the first state SG3, when a power button (PWR_BTN) is pressed, a SG3_up (evt_up_1) signal is asserted and the start instruction groups st_up_1 and st_up_2 are executed in order such that the A rail and the U rail are turned on in order (S200). The instruction decoder 44 sets the third state S3, which is indicated by the transition destination code $CD_{UP2}$ associated with the end instruction, in the state indicator 30.

In the third state S3, when the control signal SLP_S3_B is deasserted (negated), the S3_up (evt_up_3) signal is asserted. Then, the start instruction groups st_up_3 and st_up_4 are executed such that the S rail and the SX rail are turned on (S202). The PMIC 200 then enters the fifth state S0 in accordance with the transition destination code $CD_{UP4}$.

In the fifth state S0, when the SLP_S0ix_B signal is asserted, the S0_dn (evt_dn_5) signal is asserted and the stop instruction groups st_dn_4 and st_dn_3 are executed such that the SX rail and the S rail are turned off (S204). Then, the PMIC 200 enters the third state S3 in accordance with the transition destination code $CD_{UP3}$.

In the third state S3, when the SUSPWDNACK signal is asserted, the S3_dn (evt_dn_3) signal is asserted and the stop instruction groups st_dn_2 and st_dn_1 are executed in order such that the U rail and the A rail are turned off in order (S206). Then, the PMIC 200 enters the first state SG3 in accordance with the transition destination code $CD_{DN1}$.

The operation of the PMIC 200 has been described hitherto. The PMIC 200 has the following advantages.

It was necessary for conventional PMICs to be hardware-designed for each platform. Thus, there was a need to re-design the PMICs for each platform from scratch, which resulted in extended design period and high costs. On the contrary, with the PMIC 200, any states can be supported by changing positions of end instructions stored in the task list memory 10 and values of transition destination codes corresponding to these end instructions while hardware resources are put in common. That is, even when a state to be supported is changed due to a change platform, a change in hardware is unnecessary. As long as the task list memory 10 can be changed, since it is sufficient to rewrite a ROM, it is possible to deal with a variety of requirements in a very short time and reduce design costs greatly.

Even in the same platform, when an architecture other than the PMIC 200 has been changed, it may be desired to change a start order of power supplies. Even this case, since it is sufficient to change the task list memory 10 by rewriting the ROM, it is possible to cope with this in a very short time.

Secondly, the transition conditions of the event management unit 50 can be changed based on values of the register. Thus, a state to be supported is changed and accordingly, even when a control signal, which triggers a state transition, is changed, it is sufficient to change the values of the register with no need to re-design the event management unit 50. Since this means that mask modification is not required, design costs can be significantly reduced as compared with the conventional methods. If the values of the register can be written from the outside of the PMIC 200 via a serial bus, it is possible to change the transition conditions with no change in hardware of the PMIC 200.

The present disclosure has been described above by way of embodiments. The disclosed embodiments are illustrative only. It should be understood by those skilled in the art that various modifications to combinations of elements or processes may be made and such modifications fall within the scope of the present disclosure. Such modifications will be described below.

First Modification

There may be a case where transition from a certain state is to be cancelled during execution of the transition. The transition corresponding to this cancellation is represented by S108 and S110 in FIG. 5A and S208 and S210 in FIG. 5B. A PMIC 200a according to a first modification supports transition cancellations.

Figure 6:
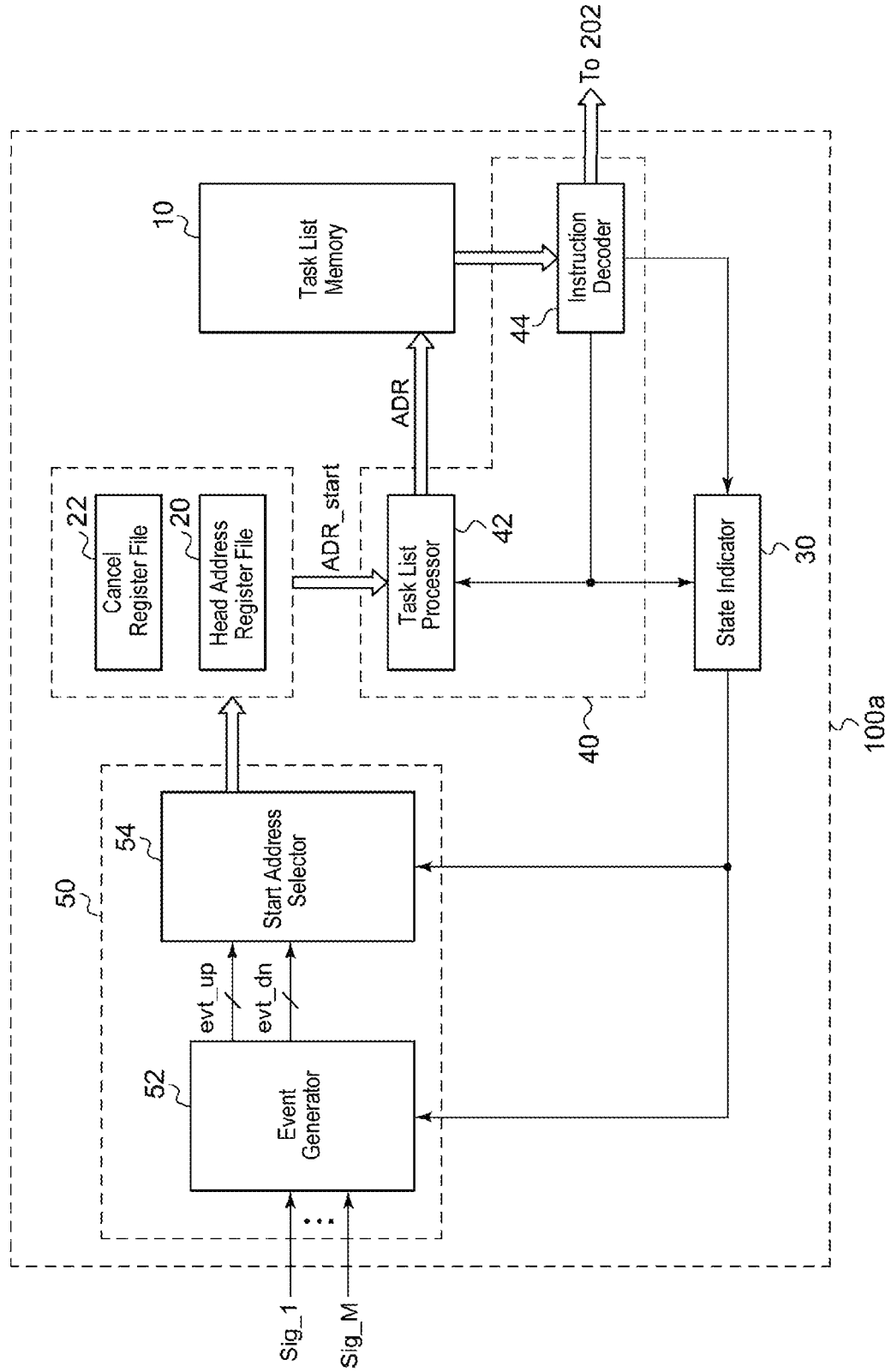
FIG. 6 is a block diagram of a power management controller according to a first modification.

FIG. 6 is a block diagram of a PM controller 100a according to the first modification. The PM controller 100a includes a cancel register file 22 in addition to the PM controller 100 shown in FIG. 2.

The cancel register file 22 (i) stores a table associating each up-transition with a $j^{th}$ state of a transition destination when up-transition from a $i^{th}$ state to the $j^{th}$ state is supported, and (ii) stores a table associating each down-transition with the $i^{th}$ state of the transition destination when down-transition from the $j^{th}$ state to the $i^{th}$ state is supported.

The event management unit 50 (i) acquires that a transition destination of up-transition is the $j^{th}$ state by referring to the cancel register file 22 when the up-transition is cancelled during execution of a start instruction group with the $i^{th}$ state as a starting point. Then, the event management unit 50 provides the instruction execution unit 40 with a head address ADR_dn_(j−1) of a $(j-1)^{th}$ stop instruction group st_dn_(j−1) as a start address.

In addition, the event management unit 50 (ii) acquires that a transition destination of down-transition is the $i^{th}$ state by referring to the cancel register file 22 when the down-transition is cancelled during execution of a stop instruction group with the $j^{th}$ state as a starting point. Then, the event management unit 50 provides the instruction execution unit 40 with a head address ADR_up_i of an $i^{th}$ start instruction group st_up_i as a start address.

The configuration of the PM controller 100a has been described hitherto. Subsequently, an operation thereof will be described.

Figure 7:
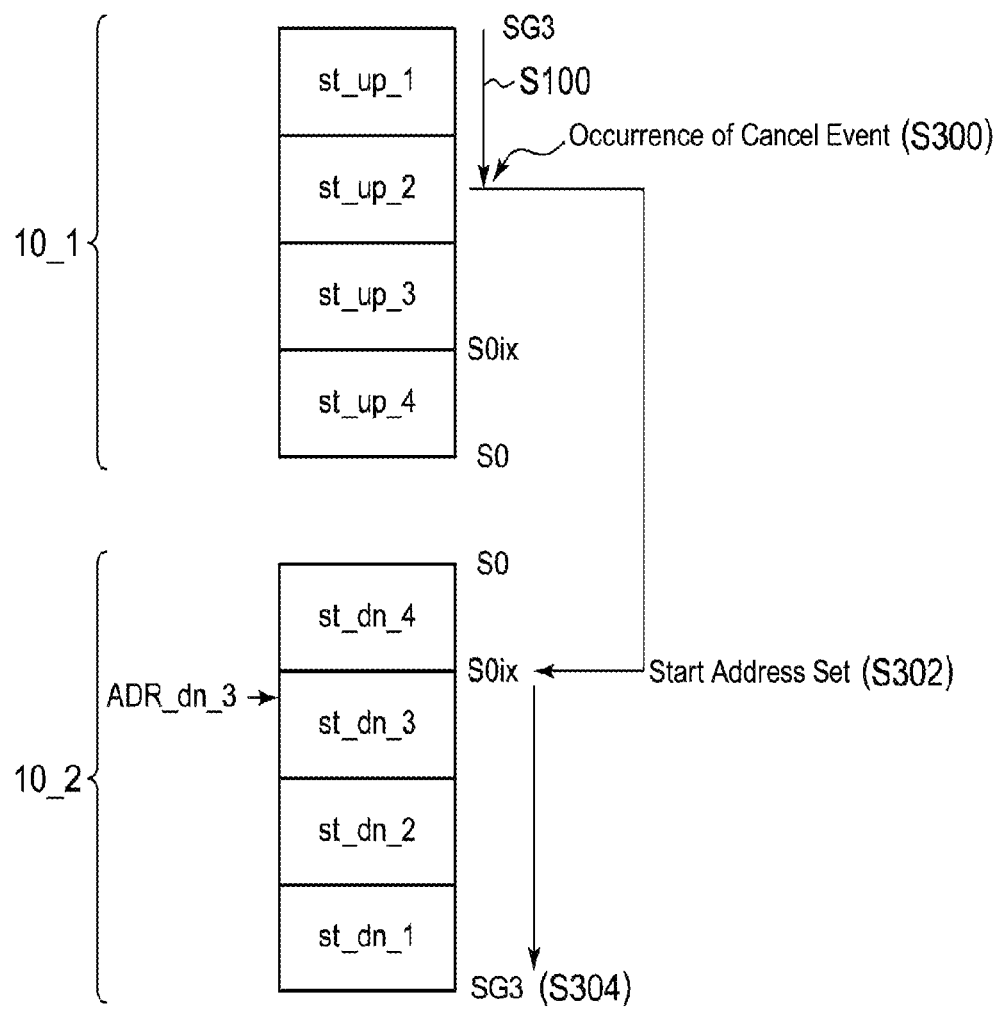
FIG. 7 is a diagram showing operations of the power management controller of FIG. 6.

FIG. 7 is a diagram showing operations of the PM controller 100a of FIG. 6. FIG. 7 shows a case of Windows 8.

Now, it is assumed that a cancel event occurred during up-transition S100 from the first state SG3 to the fourth state S0ix (S300). If the up-transition from SG3 is not satisfied, the event generator 52 generates a cancel event indicative of the fact. Upon detecting the cancel event, the start address selector 54 acquires that a transition destination of a current up-transition is the fourth state S0ix by referring to the cancel register file 22. Then, the start address selector 54 acquires a head address ADR_dn_3 of the third stop instruction group st_dn_3 with the fourth state S0ix as a starting point by referring to the head address register file 20, and provides the acquired head address to the task list processor 42 (S302). Thus, the third stop instruction group st_dn_3, the second stop instruction group st_dn_2, and the first stop instruction group st_dn_1 are executed in order and the current state returns to the first state SG3 (S304).

According to the modification of FIG. 6, a return to the original state is possible when a cancel event occurs during up-transitions and/or down-transitions.

Second Modification

In the first modification, information held by the cancel register file 22 is redundant with the transition destination codes $CD_{UP}$ and $CD_{DN}$ of FIGS. 3A and 3B. Thus, when the cancel register file 22 is installed, the transition destination codes $CD_{UP}$ and $CD_{DN}$ may not be held in the task list memory 10. In this case, when an end instruction is executed during up-transition (or down transition) with the $i^{th}$ state (or the $j^{th}$ state), a state j (or state i) of a transition destination may be acquired by referring to the cancel register file 22 and may be set in the state indicator 30.

(Applications)

Figure 8:
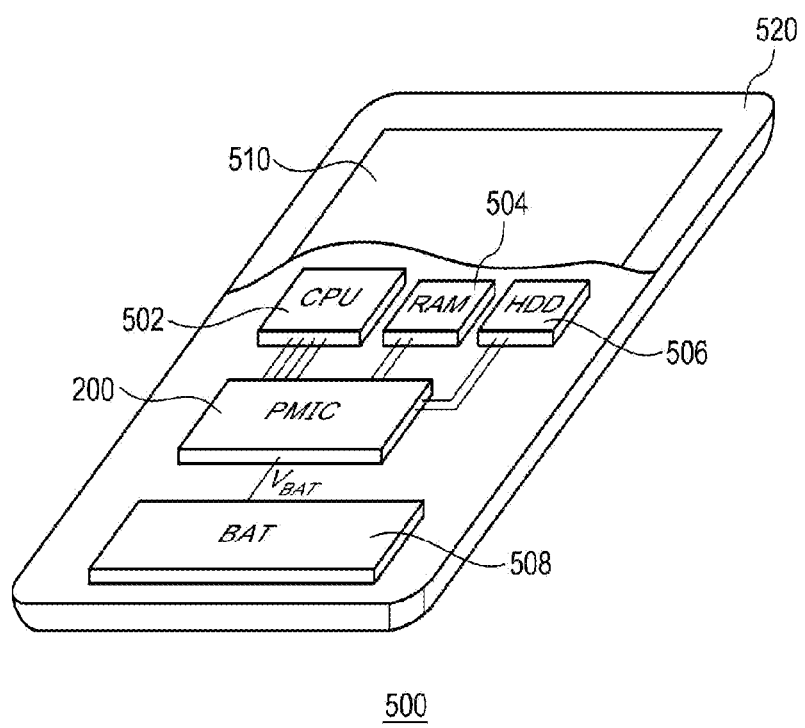
FIG. 8 is a perspective view of an electronic device including the PMIC.

Finally, applications of the PM controller 100 will be described. FIG. 8 is a perspective view of an electronic device 500 including the PMIC 200. An example of the electronic device 500 may be a tablet terminal, a smart phone, etc. The CPU 502, the RAM 504, the HDD 506, the battery 508, and the PMIC 200 are contained in a housing 520. The PMIC 200 may supply a power supply voltage to a display panel 510, a driver thereof, an audio circuit, etc. The electronic device 500 may be a laptop computer, a console game machine, a portable game machine, a wearable PC, a portable audio player, a digital camera, or the like.

According to one embodiment of the present disclosure, it is possible to provide a PMIC which is capable of flexibly dealing with a variety of desired requirements.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power management controller for controlling start and stop of a plurality of power supplies, each of which belongs to one of N rails, in which (N+1) states including a first state where all of the rails are turned off and a $(k+1)^{th}$ state (k=1, 2, . . . N) where a first rail to a $k^{th}$ rail are turned on are specified, the power management controller comprising:

a task list memory configured to (i) store a first start instruction group to start up a power supply group included in the first rail in order, a second start instruction group to start up a power supply group included in the second rail in order, . . . , and an $N^{th}$ start instruction group to start up a power supply group included in the $N^{th}$ rail in order, and (ii) store an $N^{th}$ stop instruction group to stop a power supply group included in the $N^{th}$ rail in order, an $(N-1)^{th}$ stop instruction group to stop a power supply group included in the $(N-1)^{th}$ rail in order, . . . , a second stop instruction group to stop a power supply group included in the second rail in order, and a first stop instruction group to stop a power supply group included in the first rail in order, wherein, (iii) when the power management controller supports up-transition from an $i^{th}$ state to a $j^{th}$ state (j>i), for all supported j, an end instruction is inserted in an end of a $(j-1)^{th}$ start instruction group, (iv) when the power management controller supports down-transition from the $j^{th}$ state to the $i^{th}$ state (j>i), for all supported i, an end instruction is inserted in an end of an $i^{th}$ stop instruction group, (v) the end instruction included in the end of the $((j-1)^{th}$ start instruction group is associated with a transition destination code, indicating that a transition destination is the $j^{th}$ state, and (vi) the end instruction included in the end of the $i^{th}$ stop instruction group is associated with a transition destination code, indicating that the transition destination is the $i^{th}$ state;

a head address register file configured to (i) store a head address of the $i^{th}$ start instruction group for all supported i when the power management controller supports up-transition with the $i^{th}$ state as a starting point, and (ii) store a head address of the $j^{th}$ stop instruction group for all supported j when the power management controller supports down-transition with the $j^{th}$ state as a starting point;

a state indicator indicative of a current state;

an instruction execution unit configured to (i) read and execute, when a start address is designated, instruction groups stored in the task list memory in order with the designated start address as a starting point, (ii) stop the execution of the instruction groups upon reading an end instruction, and (iii) update data of the state indicator to a state indicated by a transition destination code associated with the end instruction upon reading the end instruction; and an event management unit configured to, (i) when the state indicator indicates the $i^{th}$ state, if a control signal satisfies an up-transition condition determined for the $i^{th}$ state, provide the head address of the $i^{th}$ start instruction group as a start address from the head address register file to the instruction execution unit, and (ii) when the state indicator indicates the $j^{th}$ state, if the control signal satisfies a down-transition condition determined for the $j^{th}$ state, provide the head address of the $j^{th}$ stop instruction group as a start address from the head address register file to the instruction execution unit.

2. The power management controller of claim 1, wherein the head address register file is configured to store a head address of each of the first to $N^{th}$ start instruction groups and store a head address of each of the first to $N^{th}$ stop instruction groups.

3. The power management controller of claim 1, wherein the transition destination code is accompanied by the associated end instruction and stored in the task list memory.

4. The power management controller of claim 1, further comprising a cancel register file configured to (i) store a table that associates each up-transition with the $j^{th}$ state of a transition destination when up-transition from the $i^{th}$ state to the $j^{th}$ state is supported and (ii) stores a table that associates each down-transition with the $i^{th}$ state of the transition destination when down-transition from the $j^{th}$ state to the $i^{th}$ state is supported, wherein the event management unit is configured to (i) acquire that a transition destination of up-transition is the $j^{th}$ state by referring to the cancel register file when the up-transition is cancelled during execution of a start instruction group with the $i^{th}$ state as a starting point, and then provide the instruction execution unit with a head address of a $(j-1)^{th}$ stop instruction group as a start address, and (ii) acquire that a transition destination of down-transition is the $i^{th}$ state by referring to the cancel register file when the down-transition is cancelled during execution of a stop instruction group with the $j^{th}$ state as a starting point, and then provide the instruction execution unit with a head address of the $i^{th}$ start instruction group as a start address.

5. The power management controller of claim 1, wherein the instruction execution unit comprises:
a task list processor configured to include a program counter, set a given start address in the program counter, and increment a value of the program counter by one; and
an instruction decoder configured to decode an instruction with an address corresponding to the program counter value, the instruction being loaded from the task list memory into the instruction decoder.

6. The power management controller of claim 1, wherein the event management unit includes:
an event generator configured to receive the control signal, and assert an up-transition event signal if the control signal satisfies the up-transition condition determined for the $i^{th}$ state and assert a down-transition event signal if the control signal satisfies the down-transition condition determined for the $j^{th}$ state; and
a start address selector configured to load the head address of the $i^{th}$ start instruction group from the head address register into the instruction execution unit when the up-transition event signal for the up-transition with the $i^{th}$ state as a starting point is asserted, and load the head address of the $j^{th}$ stop instruction group from the head address register into the instruction execution unit when the down-transition event signal for the down-transition with the $j^{th}$ state as a starting point is asserted.

7. The power management controller of claim 1, wherein the event management unit includes:
a plurality of logic gates to which the control signal is input; and
a register configured to be set from the outside,
wherein the up-transition condition determined for the $i^{th}$ state and the down-transition condition determined for the $j^{th}$ state are changed based on a value of the register.

8. A power management circuit comprising:
a power management controller of claim 1; and
a plurality of power supplies configured to be controlled by the power management controller, wherein the power management controller and the plurality of power supplies are integrated on a single semiconductor substrate.

9. An electronic device comprising:
a processor having a plurality of power supply terminals; and
a power management circuit of claim 8 configured to supply a power supply voltage to the plurality of power supply terminals of the processor.

* * * * *